United States Patent [19]

Beatrez

[11] Patent Number: 5,794,378

[45] Date of Patent: Aug. 18, 1998

[54] TREE EDGING

[76] Inventor: Alan A. Beatrez, 3051 210th St. East, Prior Lake, Minn. 55372

[21] Appl. No.: 709,854

[22] Filed: Sep. 10, 1996

Related U.S. Application Data

[63] Continuation-in-part of Ser. No. 375,933, Jan. 20, 1995, abandoned.

[51] Int. Cl.$^6$ .................................................. A01G 13/02
[52] U.S. Cl. ................................................................ 47/25
[58] Field of Search ................................ 47/25 R, 25, 84

[56] References Cited

U.S. PATENT DOCUMENTS

| | | | |
|---|---|---|---|
| 1,110,377 | 9/1914 | Cowles | 47/25 R |
| 1,931,602 | 10/1933 | Colman | 47/25 |
| 3,571,972 | 3/1971 | Carter, Jr. | 47/25 |
| 4,502,244 | 3/1985 | Yoham | 47/25 |
| 4,648,203 | 3/1987 | Worzek | 47/32 |
| 4,700,507 | 10/1987 | Allen | 47/23 |
| 4,858,378 | 8/1989 | Helmy | 47/33 |
| 4,934,093 | 6/1990 | Yanna | 47/33 |
| 5,058,317 | 10/1991 | McMurtrey | 47/25 |
| 5,323,557 | 6/1994 | Sonntag | 47/25 |

FOREIGN PATENT DOCUMENTS

| | | |
|---|---|---|
| 579162 A2 | 7/1993 | European Pat. Off. |
| 2660883 | 10/1991 | France |
| 3504112A1 | 8/1986 | Germany |
| 1381679 | 1/1975 | United Kingdom |

*Primary Examiner*—Michael J. Carone
*Assistant Examiner*—Joanne C. Downs
*Attorney, Agent, or Firm*—Janal M. Kalis

[57] ABSTRACT

The device of the present invention is a landscape device positionable at the base of a tree or other vertical object. The device includes a resilient rigid main body with an outer periphery. The device is constructed of a single, molded sheet of resilient rigid plastic enclosing a central opening and a radial slit extending from the opening to an outer periphery of the main body. The device further includes two upwardly extending annular walls integral with the main body, a plurality of radial slits extending from the central opening, and an annular flange integral with the main body at one of the annular walls for anchoring the main body into the earth.

2 Claims, 1 Drawing Sheet

TREE EDGING

This Application is a Continuation-in-Part of U.S. application Ser. No. 08/375,933 filed Jan. 20, 1995, now abondoned.

BACKGROUND OF THE INVENTION

The present invention relates to a landscape apparatus.

Landscape apparatus of various types and configurations have been utilized in order to provide a shield about a plant base such as a tree or shrub. The apparatus have generally been limited to performing a single function. One type of apparatus, described in U.S. Pat. No. 3,571,972, is formed of multiple laminated sheets. This apparatus includes a resilient collar for enveloping a tree trunk in order to inhibit a growth of vegetation.

A device described in U.S. Pat. No. 4,502,244 includes an annular shield in surrounding relationship to a base of a tree. This device also includes a dual floor with a space between each of an upper portion and lower portion of the floor, whereby the lower portion directs fertilizer and water in a fluid form to feed a root system of a tree. The upper floor portion is utilized as a receptacle to hold decorative material.

A device described in U.S. Pat. No. 4,700,507 includes a plastic molded shield having two one-half interlocking sections. Each of these sections is fitted over a base portion of a tree trunk and is fastened into position with anchors in order to prevent the growth of undesirable foliage.

A device illustrated in U.S. Pat. No. 4,308,688 includes a plurality of fiberglass sections spaced about the base of a tree for protecting the tree and for preventing an undesirable growth of weeds about the tree.

A device illustrated in U.S. Pat. No. 4,700,507, describes a device for protecting bark on a base of a tree. The device is a girdle that includes two identical half sections of molded high-impact polyurethane plastic. The device is retained with spikes positioned in apertures enclosed by the device.

SUMMARY OF THE INVENTION

The device of the present invention is a landscape device positionable at the base of a tree or other vertical object. The device includes a resilient, rigid main body with an outer periphery. The device is constructed of a single, molded sheet of resilient, rigid plastic enclosing a central opening and a radial slit extending from the opening to a point on the outer periphery of the main body. The opening allows for passage of an object from outside the main body to the central opening. The device further includes two upwardly extending annular walls integral with the main body that join through an upper transition zone to form an edging on the main body outer periphery with one of the two walls being an inner wall to retain decorative material and the other wall being an outer wall to provide structural integrity and a cosmetically appealing edge. The present invention additionally includes a plurality of radial slits extending from the central opening of the main body. Further, the device includes an annular flange integral with the rigid main body at one of the annular walls for anchoring the main body into the earth. The rigid main body of the device of the present invention reversibly deforms when subjected to a shear stress.

DETAILED DESCRIPTION OF PREFERRED EMBODIMENTS

Figure 1:
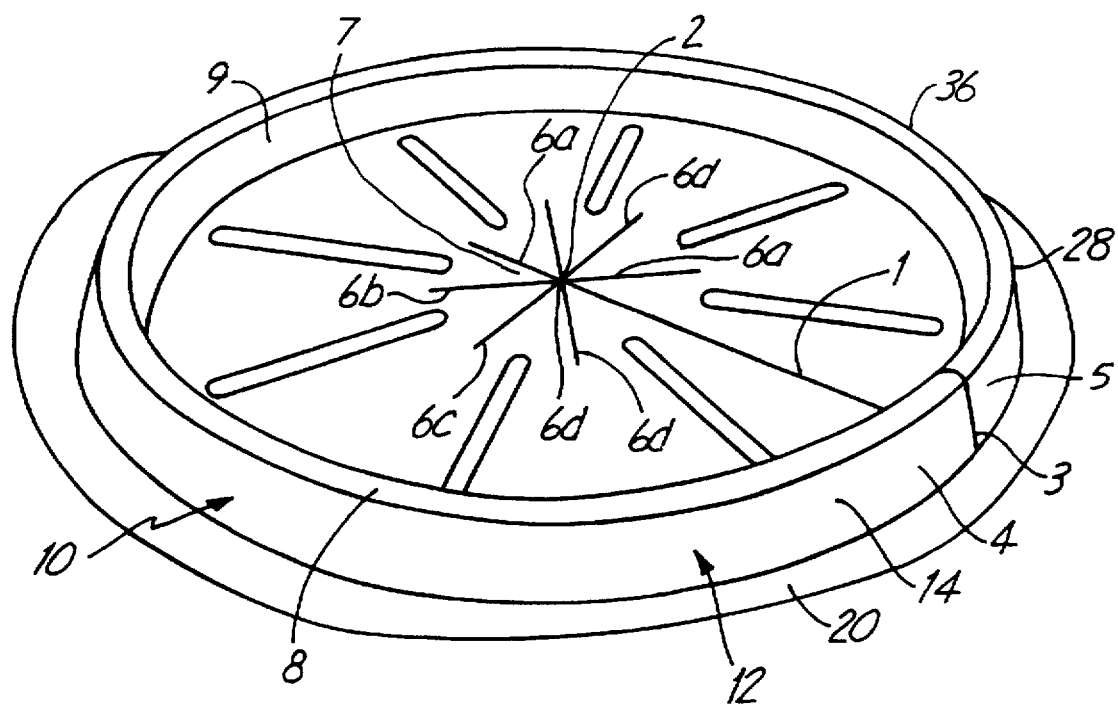
FIG. 1 is an isometric view of one embodiment of the tree edging device of the present invention.

The landscape device of the present invention, illustrated generally at 10 in FIG. 1, is a landscape device positionable at a base of a tree or other vertical object that prevents undesirable overgrowth around the tree or vertical object. The device 10 includes a resilient, rigid main body 12 constructed of a single, molded sheet of plastic with an outer periphery 14. By "resilient, rigid main body is meant that the main body reversibly deforms when subjected to a sheer stress. The main body 12 encloses a central opening 2 and a radial slit 1 extending from the opening 2 to the outer periphery of the main body 12 at 3, thereby allowing positioning of the tree or other object within the device 10. A user separates the main body 12 at the radial slit 1. The reversible deformability of the main body 12 permits the user to pull the main body 12 apart and to position the device 10 about the object, such as a tree.

The main body 12 additionally includes two upwardly extending annular walls 5 and 9 that join through an upper transition zone 8 to form an edging 28 on the main body 12 outer body periphery with one of two walls being an inner wall 9 to retain decorative material and the other wall being an outer wall 5 to provide structural integrity and a cosmetically appealing edge 36. While a planer edging 28 is shown, it is understood that the edging may be curved, mottled or modified in other conventional ways.

The main body 12 further includes a plurality of radial slits 6a–e extending from a center of the main body 12 at the central opening 2, forming fingers such as at 7. The device 10 additionally includes an annular flange 20 integral with the main body 12 for anchoring the main body 12 into the earth. The main body 12 may be anchored by covering the flange 20 with earth.

The resilient, rigid main body 12 is reversibly deformable once subjected to a shear force. With this resilient, rigid feature, the device of the present invention 10 provides a landscape apparatus that protects a plant base from contact with trimming devices such as lawn mowers and that effectively inhibits the growth of undesirable grass, weeds and the like by providing a receptacle and a receptacle edge to retain decorative material while remaining economical in design and inexpensive to manufacture. The plurality of inner radii 6 a–e radially propagate from the central point outwardly to form the resilient fingers 7 that conform to a surface of the plant base to create an enveloping action when placed in position. Undesirable plant growth within the device is inhibited due to the enveloping action of the fingers, thereby providing complete ground coverage.

The landscape device 10 of the present invention is most preferably made from a single molded sheet of plastic and encloses the central opening 2 positionable about the central plant base (not shown), vertical object or the like. The device 10 has a slit 1 that extends from the opening 2 within the device 10 to the outer wall 5, thereby creating a path of clearance to allow placement of the device 10 around the plant base when walls 4 and 5 of the device are separated by flexing.

The resilient, rigid device of the present invention 10 with fingers such as at 7 allows for use on plant bases, as well as other vertical elements, of various sizes without a need for modifying the central opening 2 size at the time of installation or throughout the specified growth period of the plan allowed within the device.

The device of the present invention 10 may be placed directly on a surface surrounding the object, such as soil or grass, thereby requiring no equipment, tools or other components for installation. Because of the flange 20 of the device of the present invention 10, the device 10 may be anchored by covering the flange 20 with a weighted material such as dirt. Thus, the device 10 of the present invention may be anchored without any additional parts, such as pins or nails.

The device 10 of the present invention is made of a material having both a rigidity and a flexibility that permits the device to be reversibly deformable when contacted by a piece of equipment, such as a lawn mower. In one embodiment, the device 10 is made of high density polyethylene. It is also contemplated that polypropylene or other crystalline material may be suitable for use in the present invention. Resilient rigidity of the device 10 is acquired as a result of a polymeric material at construction. Resilient rigidity also results from a construction which requires only a single component. Thus, the device of the present invention is constructed of a single component in one single molding step.

The inner wall 9 of the edging retains decorative material such as rock or bark while the outer wall 4 provides structural integrity and a non-hazardous, cosmetically-appealing edge.

The aforementioned description is not to be interpreted to exclude other landscape devices advantageously employing the present invention. Furthermore, it is to be understood that the above-mentioned landscape device is mainly an illustrated embodiment of the principles of this invention and other arrangements and advantages may be derived by those skilled in the art without departing from the spirit and scope of the invention.

What is claimed is:

1. A single component landscape device positionable at a base of a tree, or other vertical object consisting of:

a resilient, rigid, reversibly deformable main body comprising an outer periphery constructed of a single molded sheet of resilient, rigid plastic having a central opening and a radial slit extending from the opening to a point on the outer periphery of the main body, thereby allowing passage of an object from outside the central opening;

two upwardly extending annular walls integral with the main body that join through an upper transition zone to form an edging on the main body outer periphery with one of the two walls being an inner wall to retain decorative material and the other wall being an outer wall to provide structural integrity and a cosmetically appealing edge;

a plurality of radial slits extending from the central opening of the main body; and an annular flange integral with the main body for anchoring the main body into a material such as soil, wherein the rigid main body reversibly deforms when subjected to a shear force.

2. The device of claim 1 wherein the plurality of radial slits define a plurality of reversibly deformable fingers.

* * * * *